United States Patent
Shi et al.

(10) Patent No.: US 6,809,558 B1
(45) Date of Patent: Oct. 26, 2004

(54) PUSH-PULL OUTPUT NEURON CIRCUIT

(75) Inventors: Bingxue Shi, Beijing (CN); Chun Lu, Beijing (CN); Lu Chen, Beijing (CN)

(73) Assignee: Winbond Electronics Corporation, Hsinchu (TW)

(*) Notice: Subject to any disclaimer, the term of this patent is extended or adjusted under 35 U.S.C. 154(b) by 0 days.

(21) Appl. No.: 10/446,669

(22) Filed: May 29, 2003

(51) Int. Cl.[7] .................................................. H02M 11/00
(52) U.S. Cl. ................................. 327/103; 706/33
(58) Field of Search ........................... 327/103, 334, 327/335, 336; 706/33, 38, 40

(56) References Cited

U.S. PATENT DOCUMENTS

| | | | |
|---|---|---|---|
| 6,429,699 B1 * | 8/2002 | Shi et al. | 327/103 |
| 6,483,383 B2 * | 11/2002 | Wu | 330/253 |
| 6,664,818 B1 * | 12/2003 | Shi et al. | 327/103 |
| 6,687,686 B1 * | 2/2004 | Nervegna et al. | 706/15 |

OTHER PUBLICATIONS

Chun Lu and bingxue Shi, "Circuit design of an adjustable neuron activation function and its derivative", Electronics Letters, vol. 36, No. 6, Mar. 16, 2000, pp. 553–555.

* cited by examiner

*Primary Examiner*—Tuan T. Lam
(74) *Attorney, Agent, or Firm*—Finnegan, Henderson, Farabow, Garrett & Dunner, L.L.P.

(57) ABSTRACT

A neuron circuit generates a sigmoid transfer function and its derivative. The neuron circuit comprises an I–V converter that converts a current input signal into a voltage signal, a first output circuit having a first differential amplifier with a first current mirror as an active load, and a second output circuit having a second differential amplifier with a second current mirror as an active load, both the first and second output circuit being coupled to the voltage signal. While an output of one of the first and second output circuits is a sigmoid function of the current input, a difference between the two outputs of the two output circuits is a derivative of the sigmoid function.

19 Claims, 4 Drawing Sheets

PUSH-PULL OUTPUT NEURON CIRCUIT

FIELD OF THE INVENTION

This invention relates to an output neuron circuit and, more particularly, to a novel push-pull output neuron circuit.

BACKGROUND OF THE INVENTION

One component of an artificial neural network is its neurons, whose performance and complexity greatly affect the network. In many cases, the transfer function of the neuron is sigmoidal, and a differential amplifier has generally been used to generate such a transfer function.

In some cases, both the sigmoidal transfer function and its derivative are required, and neurons that meet such a requirement have been developed. Most of these neurons have voltage inputs and current outputs. However, a neuron with current inputs and voltage outputs would be more convenient in some applications, for example, those that employ current output synapses and voltage output neurons, because such a neuron may be capable of summing multiple input currents by connecting the input currents together in parallel at an input terminal of the neuron. U.S. Pat. No. 6,429,699 of Bingxue Shi and Chun Lu, inventors in the present application, discloses a neuron that receives a current signal and outputs a voltage.

SUMMARY OF THE INVENTION

In accordance with the present invention, there is provided a neuron circuit for generating a transfer function of a current input signal that includes a converter to convert the current input signal into a voltage signal, the converter including a current source connectable to a first bias voltage, wherein a current generated by the current source is adjustable by the first bias voltage, a resistive load connectable to at least a second bias voltage and coupled to the current source, wherein a resistance of the resistive load is adjustable by the second bias voltage, wherein the current input signal is coupled to the resistive load and is in parallel with the current generated by the current source, and the converter outputs the voltage signal at a node between the current source and the resistive load, and at least one output circuit coupled to the converter to output the transfer function, the output circuit including a differential amplifier and a current mirror as an active load for the differential amplifier.

Also in accordance with the present invention, neuron circuit for generating a transfer function of a current input signal that includes a converter to convert the current input signal Into a voltage signal, the converter including a first current source connectable to a first bias voltage, wherein a first current generated by the first current source is adjustable by the first bias voltage, a resistive load coupled to the first current source, comprising a PMOS transistor connectable to a second bias voltage and an NMOS transistor connectable to a third bias voltage, a resistance of the resistive load being adjustable by the second bias voltage and the third bias voltage, wherein the current input signal is coupled to the resistive load and is in parallel with the first current, and an output circuit coupled to the converter to output the transfer function, the output circuit including a second current source connectable to a fourth bias voltage, wherein a second current generated by the second current source is adjustable by the fourth bias voltage, a differential amplifier biased by the second current source, and a current mirror as an active load of the differential amplifier.

Still in accordance with the present invention, there is provided a neuron circuit for generating a transfer function of a current input signal and a derivative of the transfer function that includes a converter to convert the current input signal into a voltage signal that includes a first current source connectable to a first bias voltage, wherein a first current generated by the first current source is adjustable by the first bias voltage, a resistive load comprising a PMOS transistor connectable to a second bias voltage and an NMOS transistor connectable to a third bias voltage, a resistance of the resistive load being adjustable by the second bias voltage and the third bias voltage, wherein the current input signal is coupled to the resistive load and is in parallel with the first current, a first output circuit coupled to the converter that includes a second current source connectable to a fourth bias voltage, wherein a second current generated by the second current source is adjustable by the fourth bias voltage, a first differential amplifier biased by the second current source, comprising a first pair of MOS transistors, and a first current mirror as an active load of the first differential amplifier, and a second output circuit coupled to the converter that includes a third current source connectable to a fifth bias voltage, wherein a third current generated by the third current source is adjustable by the fifth bias voltage, a second differential amplifier biased by the third current source, comprising a second pair of MOS transistors, and a second current mirror as an active load of the second differential amplifier, wherein an output of a first one of the first and second output circuits is the transfer function, and a difference between an output of the first output circuit and an output of the second output circuit is the derivative of the transfer function.

Further in accordance with the present invention, there is provided a method for generating a sigmoid transfer function for a neuron circuit that receives a current input signal that includes providing a means to convert the current input signal into a voltage signal, and providing a means for generating the sigmoid transfer function using a differential amplifier and a current mirror as an active load.

Still further in accordance with the present invention, there is provided a method for generating a sigmoid transfer function and a derivative of the sigmoid transfer function for a neuron circuit that receives a current input signal that includes converting the current input signal into a voltage signal, generating a first sigmoid transfer function using a first differential amplifier and a first current mirror as an active load for the first differential amplifier, generating a second sigmoid transfer function using a second differential amplifier and a second current mirror as an active load for the second differential amplifier, and taking one of the first and second sigmoid transfer functions as the sigmoid transfer function for the neuron circuit and generating the derivative of the sigmoid transfer function by comparing the first and second sigmoid transfer functions.

Additional features and advantages of the invention will be set forth in part in the description which follows, and in part will be obvious from the description, or may be learned by practice of the invention. The features and advantages of the invention will be realized and attained by means of the elements and combinations particularly pointed out in the appended claims.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of this specification, illustrate embodiments of the invention and, together with the description, serve to explain the objects, advantages, and principles of the invention.

In the drawings.

DESCRIPTION OF THE EMBODIMENTS

Reference will now be made in detail to the present embodiments of the invention, examples of which are illustrated in the accompanying drawings. Wherever possible, the same reference numbers will be used throughout the drawings to refer to the same or like parts.

Figure 1:
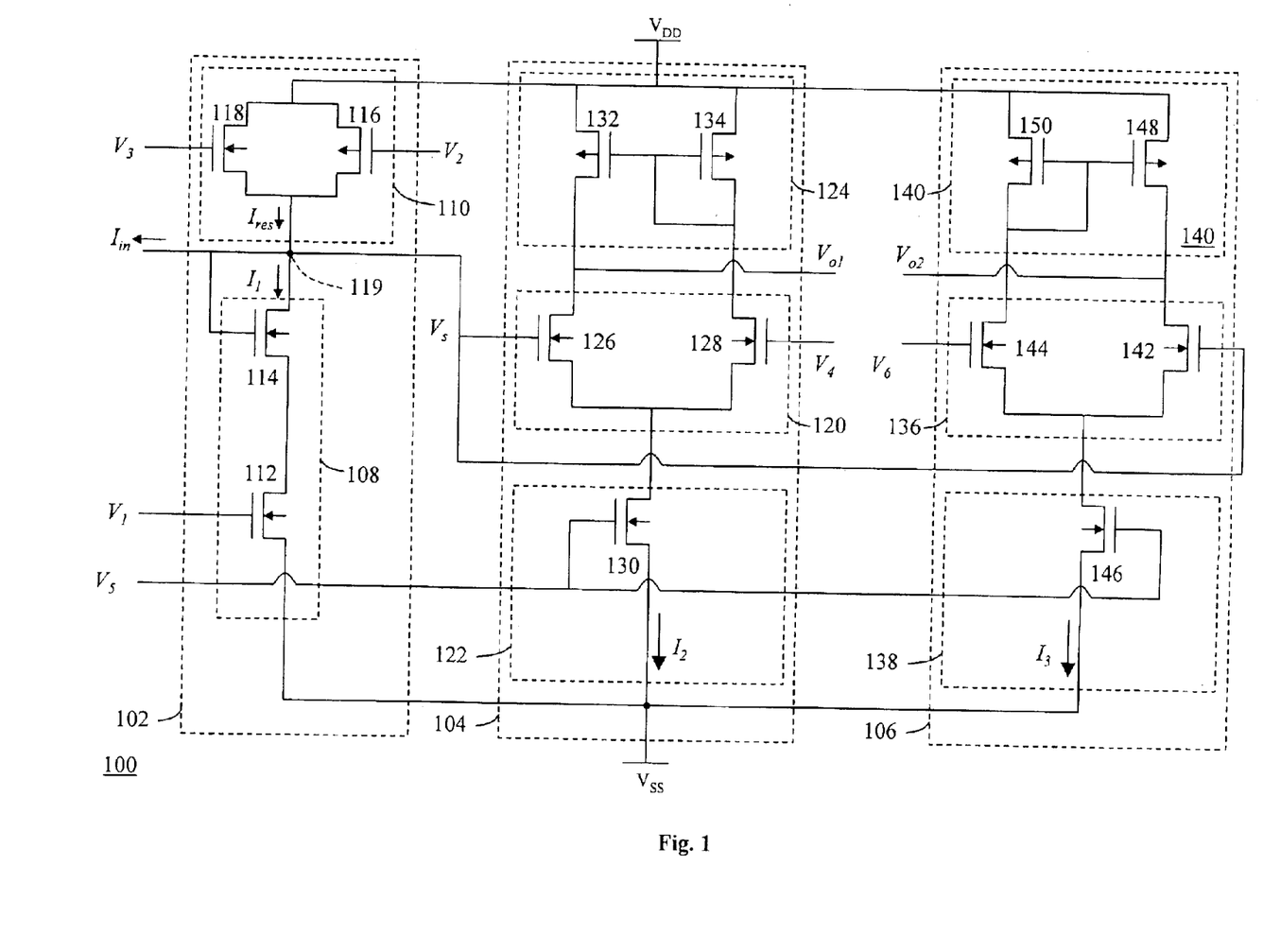
FIG. 1 shows a neuron circuit consistent with embodiments of the present invention.

An embodiment consistent with the present invention is shown in FIG. 1.

Referring to FIG. 1, a neuron circuit 100 comprises an input stage I–V converter 102, a first output circuit 104, and a second output circuit 106. Neuron circuit 100 has a positive power supply $V_{DD}$ and a negative power supply $V_{SS}$. In one aspect, positive power supply $V_{DD}$ is 2.5V and negative power supply $V_{SS}$ is –2.5V. However, $V_{DD}$ and $V_{SS}$ can also be any pair of power supply voltages encountered in integrated circuit applications.

Input stage I–V converter 102 includes an input for receiving a current input signal $I_{in}$ that is converted into a voltage signal $V_s$. Input stage I–V converter 102 comprises a first current source 108 for generating a first current $I_1$, and a resistive load 110 coupled to first current source 108. First current source 108 comprises two NMOS transistors 112 and 114. Resistive load 110 comprises a PMOS transistor 116 and an NMOS transistor 118. Each of transistors 112, 114, 116, and 118 has a source, a drain, and a gate.

The source of NMOS transistor 112 is connected to negative power supply $V_{SS}$. The drain of NMOS 112 is coupled to the source of NMOS transistor 114. The gate of NMOS transistor 112 is connectable to a first bias voltage $V_1$. Both the drain and gate of NMOS transistor 114 $V_{DD}$ are coupled to current input signal $I_{in}$.

The source of PMOS transistor 116 is coupled to the drain of NMOS transistor 118, and is further connected to positive power supply $V_{DD}$. The drain of PMOS transistor 116 is coupled to the source of NMOS transistor 118, and is further coupled to current input signal $I_{in}$. The gate of PMOS transistor 116 is connectable to a second bias voltage $V_2$ and the gate of NMOS transistor 118 is connectable to a third bias voltage $V_3$.

As shown in FIG. 1, current input signal $I_{in}$, is coupled to resistive load 110, and is in parallel with first current $I_1$ generated by first current source 108. A resistance of resistive load 110 is adjustable by second and third bias voltages $V_2$ and $V_3$. Current input signal $I_{in}$ is converted into voltage signal $V_s$ on a joint node 119 between first current source 108 and resistive load 110, i.e., at the drain of NMOS transistor 114.

First output circuit 104 comprises a first differential amplifier 120, a second current source 122, and a first current mirror 124. First differential amplifier 120 is biased by a second current $I_2$ generated by second current source 122. First current mirror 124 acts as an active load for first differential amplifier 120. First differential amplifier 120 includes a pair of NMOS transistors 126 and 128. Second current source 122 comprises an NMOS transistor 130. First current mirror 124 comprises two PMOS transistors 132 and 134. Each of transistors 126, 128, 130, 132, and 134 has a source, a drain, and a gate.

In first differential amplifier 120, the sources of both NMOS transistors 126 and 128 are coupled together and further coupled to the drain of NMOS transistor 130 of second current source 122. The drain of NMOS transistor 126 is coupled to the drain of PMOS transistor 132 of first current mirror 124. The drain of NMOS transistor 128 is coupled to the drain of PMOS transistor 134 of first current mirror 124. The gate of NMOS transistor 126 is coupled to voltage signal $V_s$. The gate of NMOS transistor 128 is connectable to a fourth bias voltage $V_4$.

In second current source 122, the gate of NMOS transistor 130 is connectable to a fifth bias voltage $V_5$. The source of NMOS transistor 130 is connected to negative power supply $V_{SS}$.

In first current mirror 124, the gates of both PMOS transistors 132 and 134 are coupled together and further coupled to the drain of PMOS transistor 134. The sources of both PMOS transistors 132 and 134 are connected to positive power supply $V_{DD}$. First output circuit 104 outputs a first output $V_{o1}$ at the drain of PMOS transistor 132.

Second output circuit 106 comprises a second differential amplifier 136, a third current source 138, and a second current mirror 140. Second differential amplifier 136 is biased by a third current $I_3$ generated by third current source 138. Second current mirror 140 acts as an active load for second differential amplifier 136. Second differential amplifier 136 includes a pair of NMOS transistors 142 and 144. Third current source 138 comprises an NMOS transistor 146. Second current mirror 140 comprises two PMOS transistors 148 and 150. Each of transistors 142, 144, 146, 148, and 150 has a source, a drain, and a gate.

In second differential amplifier 136, the sources of both NMOS transistors 142 and 144 are coupled together and further coupled to the drain of NMOS transistor 146 of third current source 138. The drain of NMOS transistor 142 is coupled to the drain of PMOS transistor 148 of second current mirror 140. The drain of NMOS transistor 144 is coupled to the drain of PMOS transistor 150 of second current mirror 140. The gate of NMOS transistor 142 is coupled to voltage signal $V_s$. The gate of NMOS transistor 144 is coupled to a sixth bias voltage $V_6$.

In third current source 138, the gate of NMOS transistor 146 is also connectable to fifth bias voltage $V_5$. The source of NMOS transistor 146 is connected to negative power supply $V_{SS}$.

In second current mirror 140, the gates of both PMOS transistors 148 and 150 are coupled together and further coupled to the drain of PMOS transistor 150. The sources of both PMOS transistors 148 and 150 are connected to positive power supply $V_{DD}$. Second output circuit 106 outputs a second output $V_{o2}$ at the drain of PMOS transistor 148.

The operation of neuron circuit 100 will be explained next.

1. Input stage I–V converter 102

Assuming NMOS transistor 112 is operating in saturation mode, current $I_1$ is determined by first bias voltage $V_1$ at the gate of NMOS transistor 112 according to the following equation (1):

$$I_1 = \frac{\beta_{112}}{2}(V_1 - V_{SS} - V_{T112})^2, \tag{1}$$

wherein $\beta_{112}$ is a transconductance parameter of NMOS transistor 112 and $V_{T112}$ is a threshold voltage of NMOS transistor 112. According to equation (1), It changes with $V_1$.

Transistors 116 and 118 can be configured to have the same transconductance parameter $\beta$. Second and third bias voltages $V_2$ and $V_3$ can be chosen such that both transistors 116 and 118 work in a linear mode. Under these conditions, a current flowing through transistors 116 and 118 has a linear relationship with a voltage drop across them, to enable resistive load 110 to have a linear resistance characteristic. A resistance R of resistive load 110 is determined by second and third bias voltages $V_2$ and $V_3$:

$$R = \frac{1}{\beta[(V_3 - V_2) - (V_{T118} + |V_{T116}|)]}, \tag{2}$$

wherein $V_{T116}$ and $V_{T118}$ are threshold voltages of PMOS transistor 116 and NMOS transistor 118, respectively. R can be adjusted by second and third bias voltages $V_2$ and $V_3$.

Since for fixed bias voltages $V_1$, $V_2$, and $V_3$, $I_1$ and R are fixed, a change in current input signal $I_{in}$ is reflected as a change in voltage signal $V_s$ at the drain of NMOS transistor 114 at node 119 according to equation (3):

$$V_s = V_{DD} - I_{res}R. \tag{3}$$

wherein $$I_{res} = I_1 + I_{in} \tag{4}$$

is a current flowing through resistive load 110.

Equations (3) and (4) shows that voltage signal $V_s$ has a linear relationship with current input signal $I_{in}$.

b 2.DC Operation of Neuron Circuit 100

Since first and second output circuits 104 and 106 have similar structures, only analysis of first output circuit 104 will be described in detail. The same analysis can be applied to second output circuit 106.

Similar to NMOS transistor 112 as discussed above, assuming NMOS transistor 130 is working in saturation mode, second current $I_2$ generated by second current source 122 is determined by fifth bias voltage $V_5$ at the gate of NMOS transistor 130:

$$I_2 = \frac{\beta_{130}}{2}(V_5 - V_{SS} - V_{T130})^2, \tag{5}$$

wherein $\beta_{130}$ is the transconductance parameter of NMOS transistor 130 and $V_{T130}$ is the threshold voltage of NMOS transistor 130.

In the DC state, when current input signal $I_{in}$ has a negative value, i.e., its direction is opposite to that shown in FIG. 1, voltage signal $V_s$ is high, NMOS transistor 126 conducts current to pull first output $V_{o1}$ down to a low value, and PMOS transistor 132 works in saturation mode. Therefore, first current mirror 124 acts as a current mirror, and a drain current of PMOS transistor 132 is equal to a drain current of PMOS transistor 134. Since, in most situations, a load of a neuron is capacitive, a drain current of NMOS transistor 126 should equal the drain current of PMOS transistor 132. As a result, the drain currents of PMOS transistors 132 and 134 are both $I_2/2$.

When current input signal $I_{in}$ has a positive value, voltage signal $V_s$ is low, and a drain current of NMOS transistor 126 is zero or very small. Therefore, PMOS transistor 132 works in a linear mode and most of current $I_2$ flows through NMOS transistor 128, and first output $V_{o1}$ has a high value.

Figure 2:
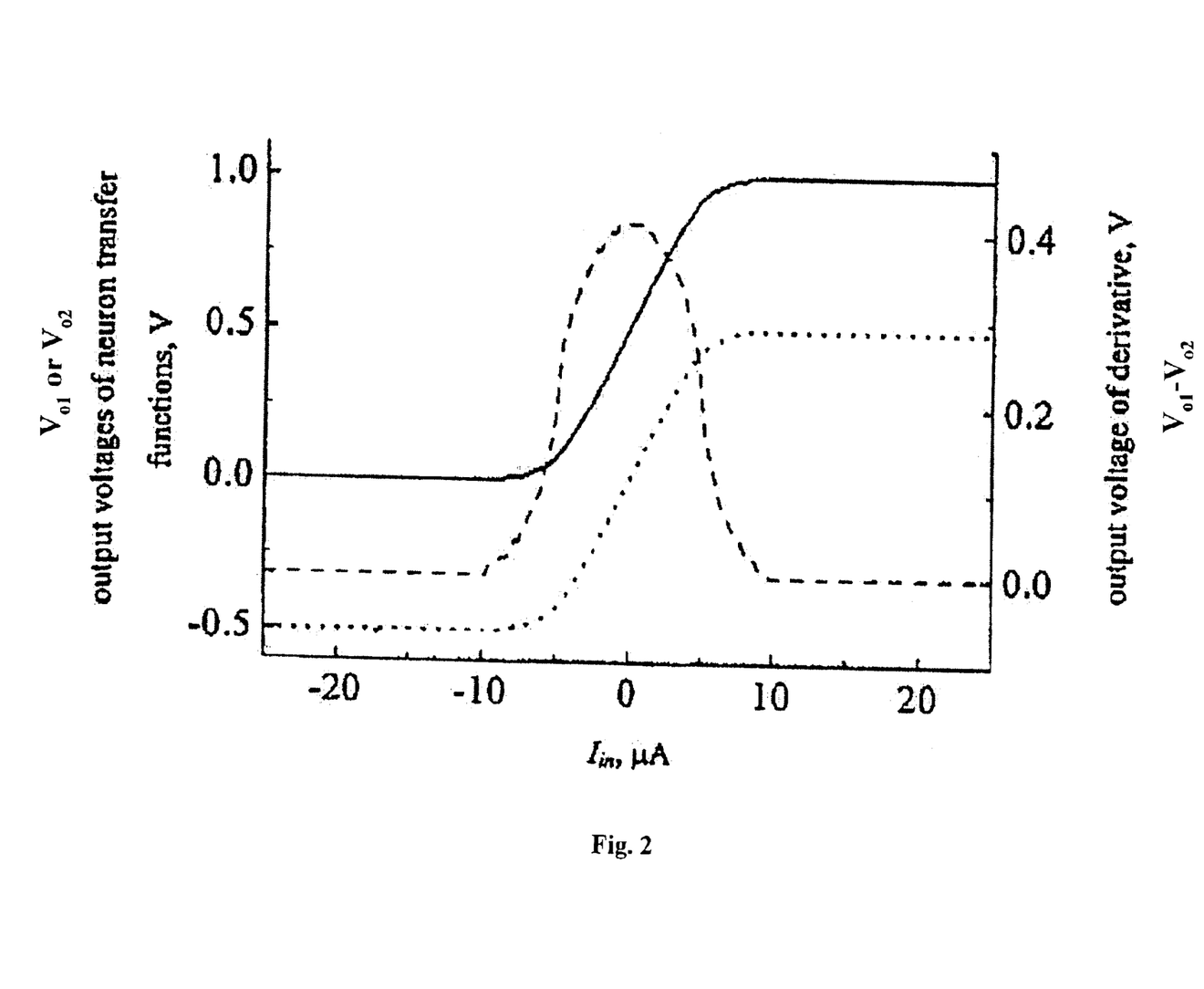
FIG. 2 shows DC simulation results of the neuron circuit shown in FIG. 1.

FIG. 2 illustrates a graphical representation of a simulated result of first output $V_{o1}$ versus $I_{in}$ as a solid line. The shape of this curve is a sigmoid curve, i.e., first output $V_{o1}$ is a sigmoidal function of $I_{in}$, and is therefore also a sigmoidal function of $V_s$, since $V_s$ has a linear relationship with $I_{in}$. A relative error between this curve and an ideal sigmoid function curve is not more than 3%.

Similarly, second output circuit 106 provides second output $V_{o2}$ having substantially the same shape as first output $V_{o1}$, except that there is a shift in the curve due to a difference between the fourth and sixth bias voltages $V_4$ and $V_6$.

A derivative of first output $V_{o1}$ with respect to current input signal $I_{in}$ may be obtained by taking a difference between first output $V_{o1}$ and second output $V_{o2}$ as explained below.

First, because $V_{o1}$ is a function of $V_s$, and $V_s$ is a function of $I_{in}$, the derivative of $V_{o1}$ with respect to $I_{in}$ can be written as, according to the chain rule, $$\frac{dV_{o1}}{dI_{in}} = \frac{dV_{o1}}{dV_s} \cdot \frac{dV_s}{dI_{in}}, \tag{6}$$

wherein $$\frac{dV_{o1}}{dI_{in}}$$

is the derivative of first output $V_{o1}$ with respect to $I_{in}$, $$\frac{dV_{o1}}{dV_s}$$

is the derivative of $V_{o1}$ with respect to $V_s$, and $$\frac{dV_s}{dI_{in}}$$

is the derivative of $V_s$ with respect to $I_{in}$.

If the function of $V_{o1}$ versus differential input $V_{s-V4}$, the neuron activation function, is denoted by f, since $V_4$ is a fixed voltage, the derivative of $V_{o1}$ with respect to $V_s$ can be determined by Equation (7):

$$\frac{dV_{o1}}{dV_s} = \frac{dV_{o1}}{d(V_s - V_4)} = \frac{f(V_s - V_4 + \Delta V) - f(V_s - V_4)}{\Delta V} \tag{7}$$

If $V_4 - V_6$ is a small voltage difference between the fourth and sixth bias voltages $V_4$ and $V_6$, $\Delta V$ in Equation (7) may be replaced with $V_4 - V_6$, and Equation (7) reduces to Equation (8):

$$\frac{dV_{o1}}{dV_s} = \frac{f(V_s - V_6) - f(V_s - V_4)}{V_4 - V_6} \tag{8}$$

$$= \frac{V_{o2} - V_{o1}}{V_4 - V_6}.$$

Moreover, the derivative of $V_s$ with respect to $I_{in}$ can be derived from equations (3) and (4):

$$\frac{dV_s}{dI_{in}} = -R. \quad (9)$$

Upon combining equations (6), (8) and (9), Equation (10) results:

$$V_{o1} - V_{o2} = -\frac{dV_{o1}}{dV_s} \cdot (V_4 - V_6) \quad (10)$$
$$= -\left(\frac{dV_{o1}}{dI_{in}} \bigg/ \frac{dV_s}{dI_{in}}\right) \cdot (V_4 - V_6)$$
$$= \frac{V_4 - V_6}{R} \cdot \frac{dV_{o1}}{dI_{in}}.$$

Thus, the difference between first and second outputs $VO_{o1}$ and $V_{o2}$ is linearly proportional to the derivative of $V_{o1}$ with respect to $I_{in}$. FIG. 2 illustrates a graphical representation of a simulated result of the derivative of $V_{o1}$ as a dashed line.

The sigmoid function of $V_{o1}$ versus $I_{in}$ can be represented by $$f(X) = \frac{1}{1 + \exp(-\alpha(X \cdot W) + \Theta)}, \quad (11)$$

wherein X is an input matrix, W is a weight matrix, α is a gain factor, and Θ is a bias voltage weight vector. Referring to FIG. 1, X and W are related to $I_{in}$, α is determined by $V_2$ and $V_3$, and Θ is determined by $V_1$.

Therefore, for neuron circuit 100, a relationship between $V_{o1}$ and $I_{in}$ can be adjusted by modifying first current $I_1$ through first bias voltage $V_1$ and second current $I_2$ through fifth bias voltage $V_5$, and second and third bias voltages $V_2$ and $V_3$.

Assuming second current $I_2$ and bias voltages $V_2$, $V_3$, and $V_4$ are fixed, to achieve the same output $V_{o1}$, $V_s$ has to be the same, which means that the total current $I_{res}$ through resistive load 110 has to be the same. It follows that $I_{in}$ should have a smaller value for a greater first current $I_1$, and a greater value for a smaller first current $I_1$. Therefore the $V_{o1}$~$I_{in}$ curve shown in FIG. 2 will shift left when $V_1$ increases, and will shift right when $V_1$ decreases.

Similarly, to achieve the same output $V_{o1}$, a larger input current $I_{in}$ would be necessary for a smaller R, assuming other variables are held constant. As a result, the relationship between $V_{o1}$ and $I_{in}$ would be changed if there is a change in $V_2$ and/or $V_3$.

3. Transient Response of Neuron Circuit 100

Figure 3A:
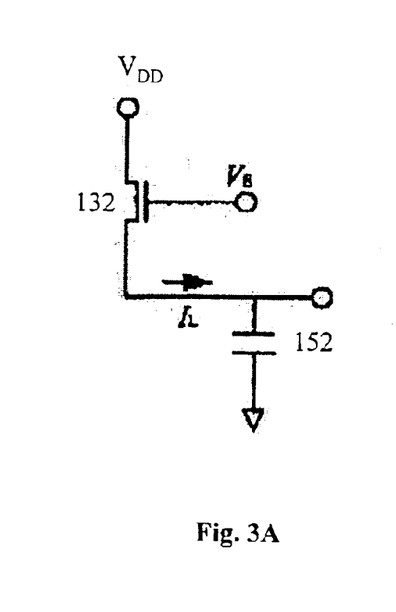
FIGS. 3A–3C show configurations used for transient analysis of the neuron circuit shown in FIG. 1.
Figure 3B:
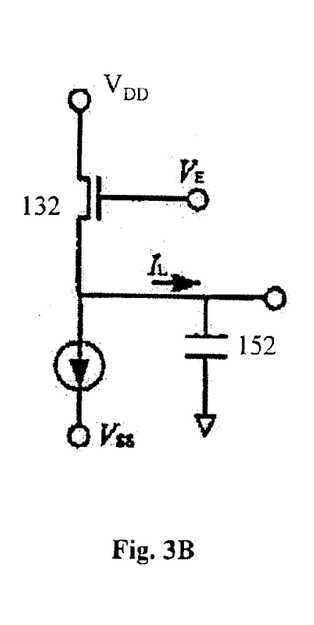
Figure 3C:
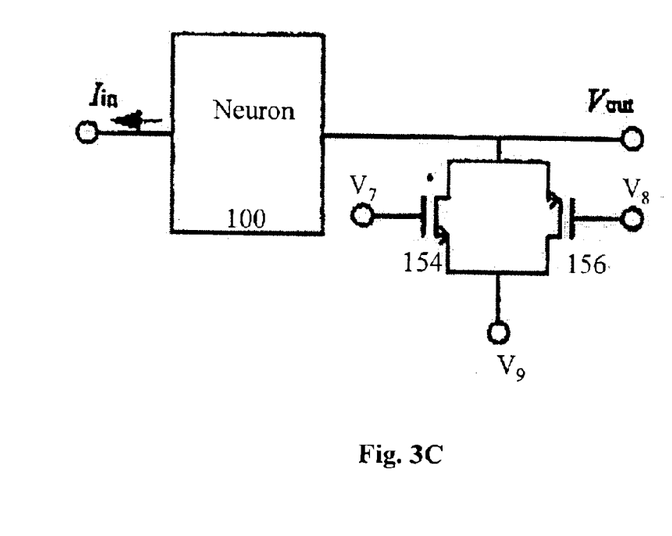

With reference to FIGS. 3A–3C, an analysis of a transient response of neuron circuit 100 is described next.

FIG. 3A shows a simplified circuit configuration for an analysis of a charging process of neuron circuit 100 when current input signal $I_{in}$ changes from a negative value to a positive value. FIG. 3B shows a simplified circuit configuration for an analysis of a discharging process of neuron circuit 100 when current input signal $I_{in}$ changes from a positive value to a negative value. FIG. 3C shows a circuit configuration that enables an adjustable output range for neuron circuit 100.

The circuit configuration in each of FIGS. 3A and 3B includes a capacitor 152 as a load coupled to one of first and second output circuits 104 and 106. For illustrative purposes, it is assumed that capacitor 152 is coupled to PMOS transistor 132 of first output circuit 104.

Referring to FIGS. 1 and 3A, if current input signal $I_{in}$ initially has a negative value, $V_s$ is high, and NMOS transistor 126 conducts current to pull first output $V_{o1}$ down to a low value. PMOS transistor 132 is therefore in saturation mode and currents through PMOS transistors 132 and 134 are both equal to $I_2/2$. Then, if current input signal $I_{in}$ suddenly changes to a positive value, voltage signal $V_s$ drops, thereby turning off or switching NMOS transistor 126 into a linear mode. The drain current of NMOS transistor 126 is therefore very small or practically zero. A charging current $I_L$ through PMOS transistor 132 starts to charge capacitor 152, with the charging current $I_L$ being represented by equation (12):

$$I_L = C_L \frac{dV_{o1}}{dt} = \quad (12)$$
$$\begin{cases} \beta_{132}(V_{G132} - V_{DD} - V_{T132})^2 & \text{(Saturation)} \\ \beta_{132}[2(V_{G132} - V_{DD} - V_{T132})(V_{o1} - V_{DD}) - & \\ \quad (V_{o1} - V_{DD})^2] & \text{(Linear)} \end{cases},$$

wherein $C_L$ is a capacitance of capacitor 152, t is time, $\beta_{132}$ is a transconductance parameter of PMOS transistor 132, $V_{G132}$ is a gate bias voltage of PMOS transistor 132, $V_{T132}$ is a threshold voltage of PMOS transistor 132, the condition for the saturation mode is defined as when $V_{G132}-V_{DD}-V_{132} \leq V_{o1}-V_{DD}$, and the condition for linear mode is defined as when $V_{G132}-V_{DD}-V_{T132} > V_{o1}-V_{DD}$.

Since NMOS transistor 126 is basically off or conducts very small current, most of second current $I_2$ flows through NMOS transistor 128 and PMOS transistor 134. Under these conditions, second current $I_2$, which is equal to the drain current of PMOS transistor 134, can be represented by equation (13):

$$I_2 = \beta_{134}(V_{G134} - V_{DD} - V_{T134})^2 = \beta_{132}(V_{G132} - V_{DD} - V_{T132})^2. \quad (13)$$

Next, v and B are defined as $$v = V_{o1} - V_{DD}, \quad (14)$$
$$B = 2(V_{G132} - V_{DD} - V_{T132}) = 2\sqrt{\frac{I_2}{\beta_{132}}}.$$

An infinitesimal change in time t, dt, can then be expressed as $$dt = \begin{cases} \frac{4C_L}{B^2 \beta_{132}} dv & \left(\text{Saturation, or } v \leq \frac{B}{2}\right) \\ \frac{C_L}{\beta_{132}} \cdot \frac{dv}{Bv - v^2} & \left(\text{Linear, or } v > \frac{B}{2}\right) \end{cases}. \quad (15)$$

An integral of (15) gives $$\int dt = \begin{cases} \frac{4C_L}{B^2 \beta_{132}} v + C_1 & \left(\text{Saturation, or } v \leq \frac{B}{2}\right) \\ \frac{C_L}{\beta_{132}} \cdot \frac{1}{B} \ln \frac{v}{B-v} + C_2 & \left(\text{Linear, or } v > \frac{B}{2}\right) \end{cases}, \quad (16)$$

wherein $C_1$ and $C_2$ are constants. If first output $V_{o1}$ has a maximum value of $V_{oH}$ and a minimum value of $V_{oL}$, a rising time $t_r$ for $V_{o1}$ will be $$t_r = \frac{C_L}{\beta_{132}} \left( \frac{1}{B} \ln \frac{V_{oH} - V_{DD}}{B - (V_{oH} - V_{DD})} - \frac{4}{B^2}(V_{oL} - V_{DD}) \right). \quad (17)$$

During a discharging process, current input signal $I_{in}$ changes from a positive value to a negative value, and NMOS transistor 126 conducts a current of $I_2/2$ after the transition, which is shown in FIG. 3B as a current source of $I_{ref}/2$. A similar analysis can be carried out to obtain a falling time $t_r$:

$$t_f = \frac{C_L}{\beta_{132}} \left( \frac{1}{\frac{B}{2\sqrt{2}} - (V_{oH} - V_{DD})} - \frac{1}{\frac{B}{2\sqrt{2}} - (V_{oL} - V_{DD})} \right). \quad (18)$$

Figure 4A:
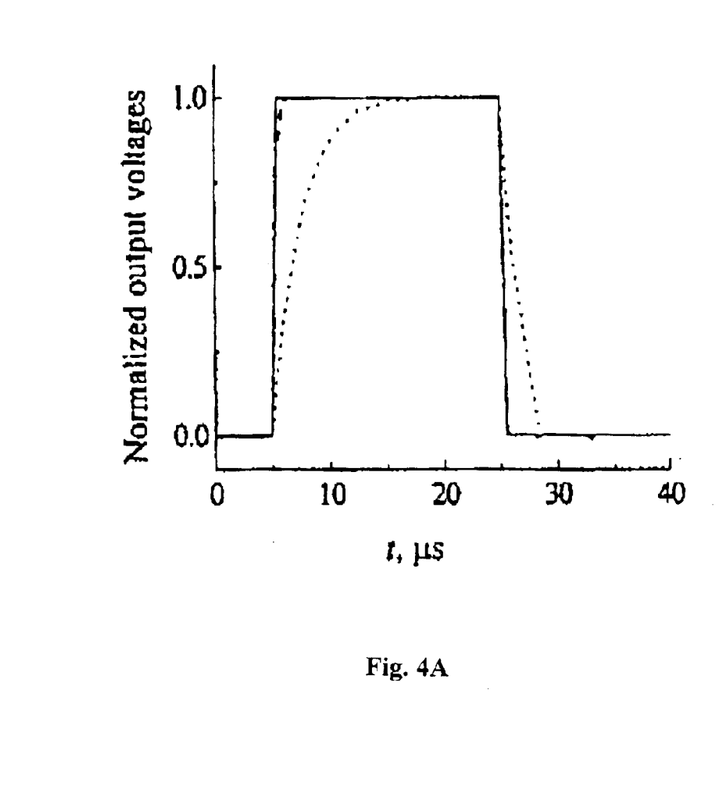
FIGS. 4A–4B show transient simulation results of the circuit configuration show in FIG. 3C and a conventional neuron circuit, respectively.
Figure 4B:
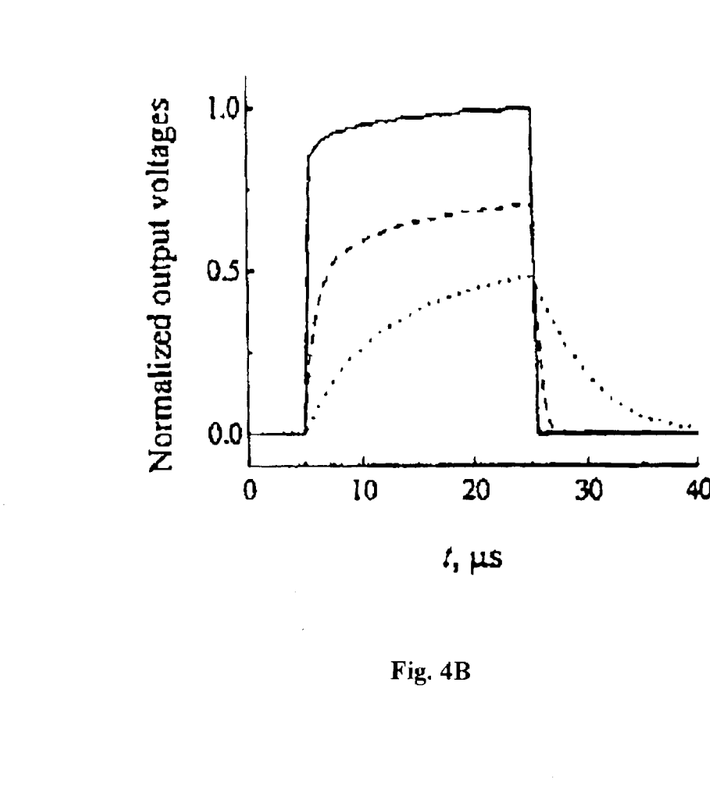

FIG. 4A shows simulated results of equations (15) and (16). FIG. 4B shows transient performance of a conventional neuron circuit. In both FIGS. 4A and 4B, the vertical coordinates are normalized as shown by equation (17):

$$V_n = \frac{V_{oI} - V_{oL}}{V_{oH} - V_{oL}}. \quad (17)$$

Also in FIGS. 4A and 4B, the solid lines represents simulation results when $C_L$=1 pF, the dashed lines represents simulation results when $C_L$=10 pF, and the dotted lines represents simulation results when $C_L$=100 pF. As seen in these simulation results, a neuron circuit consistent with the present invention has an improved transient response.

In FIG. 3C, an NMOS transistor 154 and a PMOS transistor 156 are coupled to first output $V_{o1}$. A gate of NMOS transistor 154 is connectable to a seventh bias voltage $V_7$. A gate of PMOS transistor 156 is connectable to an eighth bias voltage $V_8$. A drain or source of NMOS transistor 154 is coupled to a drain or source of PMOS transistor 156, and is further connectable to a ninth bias voltage $V_9$. Simulation results (not illustrated) show that transistors 154 and 156 have little influence to the transient performance of neuron circuit 100 but make available various output ranges. $V_5$ determines the value $V_{oH}-V_{oL}$, while $V_9$ shifts an output range of $V_{o1}$. For a fixed value of $V_5$, output $V_{o1}$ shifts downward when $V_9$ decreases. For example, when $V_5$=1.5V, the output range of $V_{o1}$ is [0V, 1V] for a $V_9$ of -0.10V, and [-0.5V, 0.5V] for a $V_9$ of -0.48V, which can be regarded as LOG sigmoid and tangent sigmoid functions, as shown in FIG. 2 as the solid line and a dotted line, respectively. The symmetrical output range of the tangent sigmoid function can make full use of a four-quadrant Gilbert multiplier, which is very popular in neural network circuits.

Simulations that generated the results shown in FIGS. 2 and 4A–4B were performed with HSPICE, using level 47 transistor models for a standard 1.2 µm CMOS process.

It is noted that, although first output $V_{o1}$ has been used for analysis herein, due to a symmetry between first and second output circuits 104 and 106, second output $V_{o2}$ can also be output as the transfer function, the difference between $V_{o1}$ and $V_{o2}$ being the derivative of $V_{o2}$.

It will be apparent to those skilled in the art that various modifications and variations can be made in the disclosed process without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A neuron circuit for generating a transfer function of a current input signal, comprising:
   a converter to convert the current input signal into a voltage signal, comprising
      a current source connectable to a first bias voltage, wherein a current generated by the current source is adjustable by the first bias voltage,
      a resistive load connectable to at least a second bias voltage and coupled to the current source, wherein a resistance of the resistive load is adjustable by the second bias voltage,
      wherein the current input signal is coupled to the resistive load and the converter outputs the voltage signal at a node between the current source and the resistive load; and
   at least one output circuit coupled to the converter to output the transfer function, comprising a differential amplifier and a current mirror as an active load for the differential amplifier.

2. The neuron circuit of claim 1, wherein the voltage signal is a linear function of the current input signal.

3. The neuron circuit of claim 1, wherein the current source comprises a first and a second transistor serially coupled together, each having a gate, a source and a drain, and wherein the gate of the first transistor is connectable to the first bias voltage, and the gate and drain of the second transistor are tied together and further coupled to the current input signal.

4. The neuron circuit of claim 1, wherein the resistive load comprises a PMOS transistor and an NMOS transistor each having a drain, a gate and a source, and wherein one of the source and drain of the PMOS transistor is coupled to one of the drain and source of the NMOS transistor and the other of the drain and source of the PMOS transistor is coupled to the other of the source and drain of the NMOS transistor.

5. The neuron circuit of claim 4, wherein the at least a second bias voltage comprises the second bias voltage and a third bias voltage, the gate of the PMOS transistor being coupled to the second bias voltage, the gate of the NMOS transistor being coupled to the third bias voltage, and wherein the resistance of the resistive load is adjustable by both the second bias voltage and the third bias voltage.

6. A neuron circuit for generating a transfer function of a current input signal, comprising:
   a converter to convert the current input signal into a voltage signal, comprising
      a first current source connectable to a first bias voltage, wherein a first current generated by the first current source is adjustable by the first bias voltage,
      a resistive load coupled to the first current source, comprising a PMOS transistor connectable to a second bias voltage and an NMOS transistor connectable to a third bias voltage, a resistance of the resistive load being adjustable by the second bias voltage and the third bias voltage,
      wherein the current input signal is coupled to the resistive load; and
   an output circuit coupled to the converter to output the transfer function, comprising
      a second current source connectable to a fourth bias voltage, wherein a second current generated by the second current source is adjustable by the fourth bias voltage,
      a differential amplifier biased by the second current source, and
      a current mirror as an active load of the differential amplifier.

7. The neuron circuit of claim 6, wherein the differential amplifier comprises a pair of transistors.

8. The neuron circuit of claim 6, wherein the current mirror comprises a pair of transistors coupled together.

9. The neuron circuit of claim 6, wherein the second current source comprises a transistor.

10. The neuron circuit of claim 6, wherein an output range of the output circuit is adjustable by any of the first, second, third, and fourth bias voltages.

11. The neuron circuit of claim 6, wherein the differential amplifier has a first and a second input terminal, the first input terminal being coupled to the voltage signal and the second input terminal being connectable to a fifth bias voltage.

12. The neuron circuit of claim 6, wherein the transfer function is sigmoidal.

13. A neuron circuit for generating a transfer function of a current input signal and a derivative of the transfer function, comprising:

a converter to convert the current input signal into a voltage signal, comprising
a first current source connectable to a first bias voltage, wherein a first current generated by the first current source is adjustable by the first bias voltage,
a resistive load comprising a PMOS transistor connectable to a second bias voltage and an NMOS transistor connectable to a third bias voltage, a resistance of the resistive load being adjustable by the second bias voltage and the third bias voltage,
wherein the current input signal is coupled to the resistive load;

a first output circuit coupled to the converter, comprising
a second current source connectable to a fourth bias voltage, wherein a second current generated by the second current source is adjustable by the fourth bias voltage,
a first differential amplifier biased by the second current source, comprising a first pair of MOS transistors, and
a first current mirror as an active load of the first differential amplifier; and a second output circuit coupled to the converter, comprising
a third current source connectable to a fifth bias voltage, wherein a third current generated by the third current source is adjustable by the fifth bias voltage,
a second differential amplifier biased by the third current source, comprising a second pair of MOS transistors, and
a second current mirror as an active load of the second differential amplifier, wherein an output of a first one of the first and second output circuits is the transfer function and a difference between an output of the first output circuit and an output of the second output circuit is the derivative of the transfer function.

14. The neuron circuit of claim 13, wherein each of the first and second differential amplifiers has first and second input terminals, and wherein the first input terminal of the first differential amplifier and the first input terminal of the second differential amplifier are coupled to the voltage signal, the second input terminal of the first differential amplifier is connectable to a sixth bias voltage, and the second input terminal of the second differential amplifier is connectable to a seventh bias voltage, and wherein the sixth bias voltage is not equal to the seventh bias voltage.

15. The neuron circuit of claim 13, wherein an output of the first output circuit is adjustable by any of the first, the second, the third, and the fourth bias voltages, and an output of the second output circuit is adjustable by any of the first, the second, the third, and the fifth bias voltages.

16. The neuron circuit of claim 13, wherein the fourth bias voltage is equal to the fifth bias voltage.

17. The neuron circuit of claim 13, further comprising an NMOS transistor and a PMOS transistor coupled to a second one of the first and second output circuits, wherein each of the NMOS transistor and the PMOS transistor has a drain, a source, and a gate, one of the drain and source of the NMOS transistor being coupled to one of the drain and source of the PMOS transistor and further being connectable to a sixth bias voltage, and wherein an output range of the second one of the first and second output circuit is adjustable by the sixth bias voltage.

18. The neuron circuit of claim 17, wherein the output of the second one of the first and second output circuit is a tangent sigmoid function.

19. A method for generating a sigmoid transfer function and a derivative of the sigmoid transfer function for a neuron circuit that receives a current input signal, comprising:

converting the current input signal into a voltage signal;

generating a first sigmoid transfer function using a first differential amplifier and a first current mirror as an active load for the first differential amplifier;

generating a second sigmoid transfer function using a second differential amplifier and a second current mirror as an active load for the second differential amplifier; and taking one of the first and second sigmoid transfer functions as the sigmoid transfer function for the neuron circuit and generating the derivative of the sigmoid transfer function by outputting a difference between the first and second sigmoid transfer functions.

* * * * *